United States Patent
You et al.

(10) Patent No.: US 7,302,305 B2
(45) Date of Patent: Nov. 27, 2007

(54) JOB QUEUE MANAGEMENT SYSTEM AND METHOD THEREOF, INCLUDING CLUSTERING WAFER LOTS PROCESSED BY COMMON RECIPE INTO GROUP, AND CREATING PROCESS JOB AND CONTROL JOB

(75) Inventors: James You, Hsinchu (TW); Shen-Jr Jang, Taiping (TW); King-Chuan Sun, Jhubei (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 578 days.

(21) Appl. No.: 10/818,916

(22) Filed: Apr. 6, 2004

(65) Prior Publication Data

US 2005/0221596 A1    Oct. 6, 2005

(51) Int. Cl.
*G06F 19/00* (2006.01)

(52) U.S. Cl. .................. 700/102; 700/101; 700/121
(58) Field of Classification Search ................ 700/100, 700/102, 121, 101
See application file for complete search history.

(56) References Cited

U.S. PATENT DOCUMENTS

| 7,043,319 B1 * | 5/2006 | Logsdon et al. ............ 700/100 |
| 2004/0049398 A1 * | 3/2004 | Gartland et al. ............... 705/1 |

* cited by examiner

*Primary Examiner*—Ryan A Jarrett
(74) *Attorney, Agent, or Firm*—Thomas, Kayden, Horstemeyer & Risley

(57) ABSTRACT

A system and method for job queue management. A job queue management apparatus acquires multiple wafer lot records individually regarding a plurality of wafers processed by a recipe, clusters the wafer lots by the common recipe into a group, creates a process job corresponding to the group, and stores the process job in a job queue of a fabrication tool.

21 Claims, 10 Drawing Sheets

JOB QUEUE MANAGEMENT SYSTEM AND METHOD THEREOF, INCLUDING CLUSTERING WAFER LOTS PROCESSED BY COMMON RECIPE INTO GROUP, AND CREATING PROCESS JOB AND CONTROL JOB

BACKGROUND

The present invention relates to job queue management technology, and more particularly, to a method and system of job queue management in wafer fabrication.

A conventional semiconductor factory typically includes requisite fabrication tools to process semiconductor wafers for a particular purpose, employing processes such as photolithography, chemical-mechanical polishing, or chemical vapor deposition. During manufacture, the semiconductor wafer passes through a series of process steps, performed by various fabrication tools. For example, in the production of an integrated semiconductor product, the semiconductor wafer can pass through up to 600 process steps.

The wafers are typically stored in containers, such as cassettes, each of which holds up to 25 wafers. The cassettes are then loaded in carriers, such as standard mechanical interfaces (SMIFs) or front opening unified pods (FOUPs) for transport throughout the factory. A carrier may contain multiple wafer lots to undergo a fabrication task. A preparation is performed when changing process recipe. For example, an implanter must spend 10 minutes beam tuning and subsequently another 10 minutes in to implant ions upon 25 wafers. Conventionally, fabrication tools use much time repeatedly performing preparations even when wafer lots corresponding to a common recipe, are interlaced in a carrier or multiple carriers. For example, if four wafer lots, such as "lot1", "lot2", "lot3" and "lot4", may require sequential implantation according to "recipe1", "recipe2", "recipe1" and "recipe2", twenty minutes will be wasted performing redundant beam tunings.

In view of these limitations, a need exists for an apparatus and method of job queue management that arranges process jobs according to common recipes, thereby reducing preparation time.

SUMMARY

It is therefore an object of the present invention to provide a system and method of job queue management that arranges process jobs according to common recipes, thereby reducing preparation time.

According to an embodiment of the invention, the system includes a job queue management apparatus and a fabrication tool.

The fabrication tool typically performs a single wafer fabrication task on the wafers in a given lot. The wafer fabrication task is performed according to a predefined procedure (i.e., a predetermined set of steps or "recipe"). When changing recipe, the fabrication tool performs a preparation task. A process job is provided to associate with one or more wafer lots and specify a particular recipe. A control job with relevant priority is provided to manage the process job sequence. When executing a process job, a process job start event is provided to the job queue management apparatus.

The job queue management apparatus includes a central processing unit (CPU), memory, a storage device, an input device, a display device and a communication device. The CPU is controlled by instructions from the memory and an operator through the input device, and executes job queue management functions correspondingly.

The memory preferably includes a job initiation module and a job rearrangement module, which include routines to perform job queue management functions.

The object of the job initiation module is to create and arrange the process and control job order, thus enabling the fabrication tool to process wafer lots utilizing a common recipe. The detection of common recipes can be achieved by a "RecipeID" identity or a "RecipeVariableList" list. The job initiation module acquires wafer lot information regarding which specific wafers require processing by which recipe from a manufacturing execution system (MES) or a computer integrated manufacturing (CIM) system. The job initiation module clusters wafer lots processed by a common recipe into a common process program (CPP) group and creates a process job containing wafer lots in the CPP group. A control job containing at least one process job with priority is created. The control jobs are arranged in descending order according to the control job priorities.

The job rearrangement module acquires a current recipe after receiving a process job start event from the fabrication tool. The job rearrangement module acquires all control jobs and process jobs therewith. A control job containing a common recipe is detected by comparing the currently performed recipe. The detected control job with priority equaling that of the current control job, is moved to the top of job queue.

BRIEF DESCRIPTION OF THE DRAWINGS

The aforementioned objects, features and advantages of this invention will become apparent by referring to the following detailed description of the preferred embodiment with reference to the accompanying drawings, wherein.

DESCRIPTION

Figure 1:
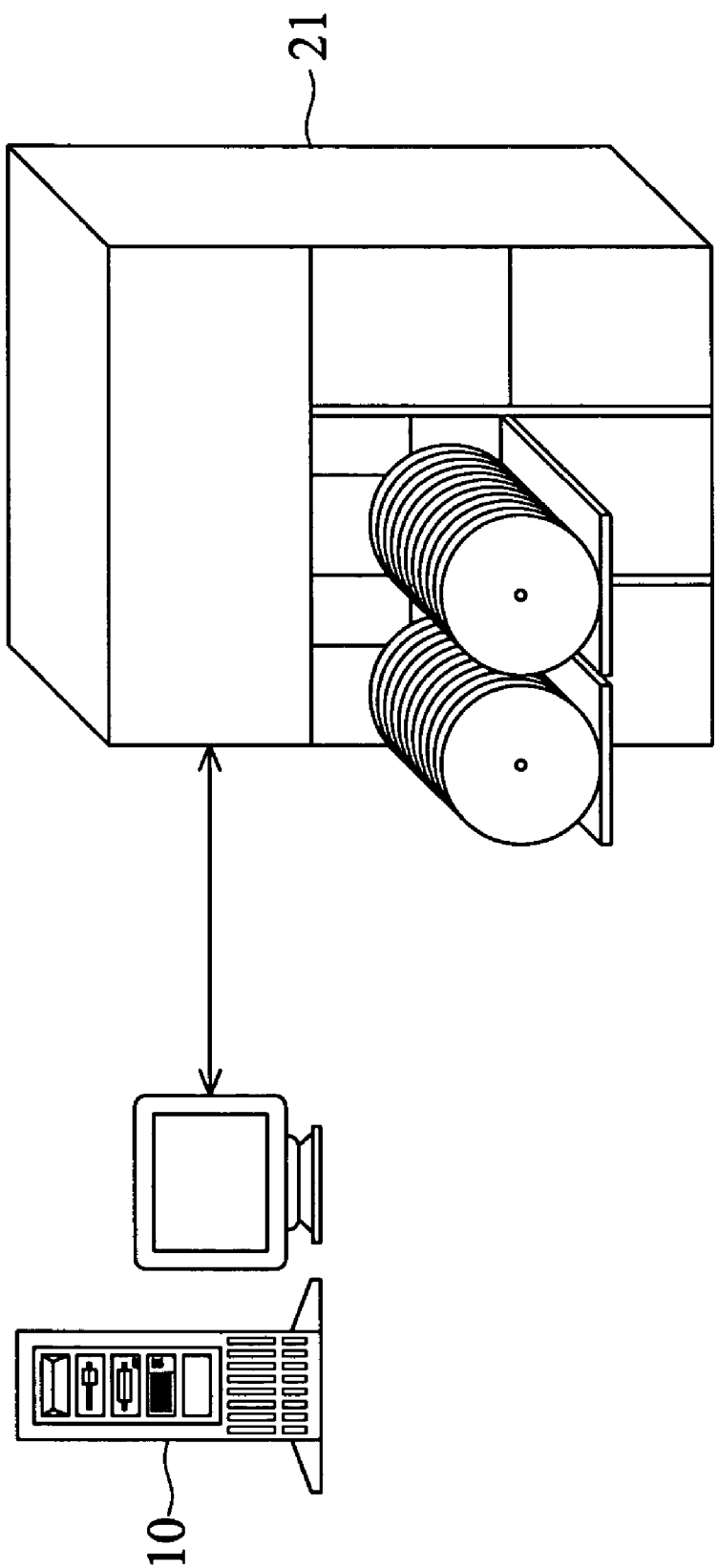
FIG. 1 is a diagram of the architecture of the system for job queue management according to the present invention.

FIG. 1 is a diagram of the architecture of the system for job queue management according to the present invention. According to the invention, the system includes a job queue management apparatus 10 and a fabrication tool 21.

The fabrication tool 21 typically performs a single wafer fabrication task on the wafers in a given lot. For example, a particular fabrication tool may perform layering, patterning, doping, implanting or heat treatment operations on the wafers. In a preferred embodiment described hereafter, the fabrication tool 21 provides software services compliant to 300 mm semiconductor equipment and material international (SEMI) standard specifying transport protocol, message format and functionality. A process job is provided for association with one or more wafer lots and to specify a particular recipe, and a control job with relevant priority is provided to manage the process job sequence. When executing a process job, an E40 event indicating a process job start is introduced by SEMI, such as "E40:PJ_SettingUpToExec", "E40:PJ_WaitingStartToExec" or others, is sent to the job queue management apparatus 10.

Figure 2:
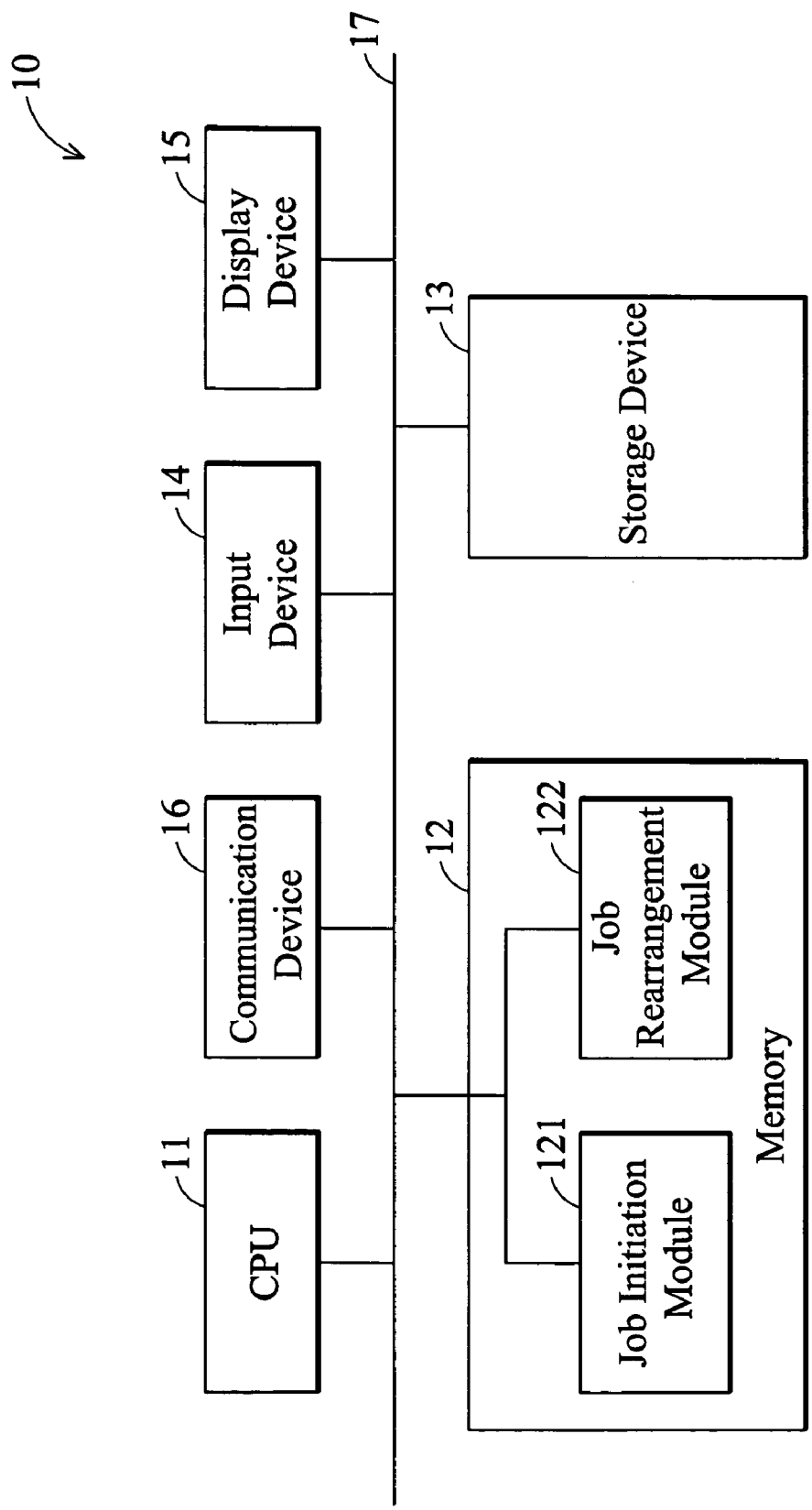
FIG. 2 is a diagram of the architecture of the job queue management apparatus according to the present invention.

FIG. 2 is a diagram of the architecture of the job queue management apparatus according to the present invention. The job queue management apparatus 10 includes a central processing unit (CPU) 11, memory 12, a storage device 13, an input device 14, a display device 15 and a communication device 16. The CPU 11 is connected by buses 17 to the memory 12, storage device 13, input device 14, display device 15 and communication device 16 based on Von Neumann architecture. The CPU 11, memory 12, storage device 13, display device 15, input device 14 and communication device 16 may be conventionally incorporated to a mainframe computer, a mini-computer, a workstation computer, a host computer, a personal computer, or a mobile computer.

The CPU 11, controlled by instructions from the memory 12 and an operator through the input device 14, executes job queue management functions. The storage device 13 can be implemented as a database system, a file, or the like.

The memory 12 is preferably a random access memory (RAM), but may also include read-only memory (ROM) or flash ROM. The memory 12 preferably includes a job initiation module 121 and a job rearrangement module 122, which include routines to perform job queue management functions.

The object of the job initiation module 121 is to create and arrange the process and control job order, thus enabling the fabrication tool 21 to process wafer lots performed by a common recipe. The detection of common recipes can be achieved by a "RecipeID" identity or a "RecipeVariableList" list. The job initiation module 121 acquires wafer lot information regarding which specific wafers require processing by which recipe from a manufacturing execution system (MES) (not shown) or a computer integrated manufacturing (CIM) system (not shown). The job initiation module 121 clusters wafer lots processed by a common recipe into a common process program (CPP) group and creates a process job containing wafer lots in the CPP group by executing an E40 service introduced by SEMI, such as "E40: S16F3_PrJobCreate", "E40:S16F11_PRJobCreateEnh" or others. A control job with a priority associated with at least one process job is created by executing an E94 service, such as "E94:S14F9_CJCreate" or others. The control jobs are arranged in descending order according to control job priorities.

The job rearrangement module 122 receives an E40 event indicating a process job start, such as "E40:PJ_SettingUpToExec", "E40:PJ_WaitingStartToExec" or other, from the fabrication tool 21. After that, a currently performed recipe is acquired from the fabrication tool 21 by executing an E39 service, such as "E39:S14F1_GetPJ" or others. The job rearrangement module 122 acquires all control jobs by executing an E39 service, such as "E39:S14F1_GetAllCJ" or others, and process jobs therewith by executing an E39 service, such as "E39:S14F1_GetPJ" or others. A control job containing a common recipe is detected by comparison with the currently performed recipe. The detected control job with priority equaling that of the current control job is moved to the top of job queue by executing an E94 service, such as "E94:S16F27_CJHOQ" or others.

Figure 3A:
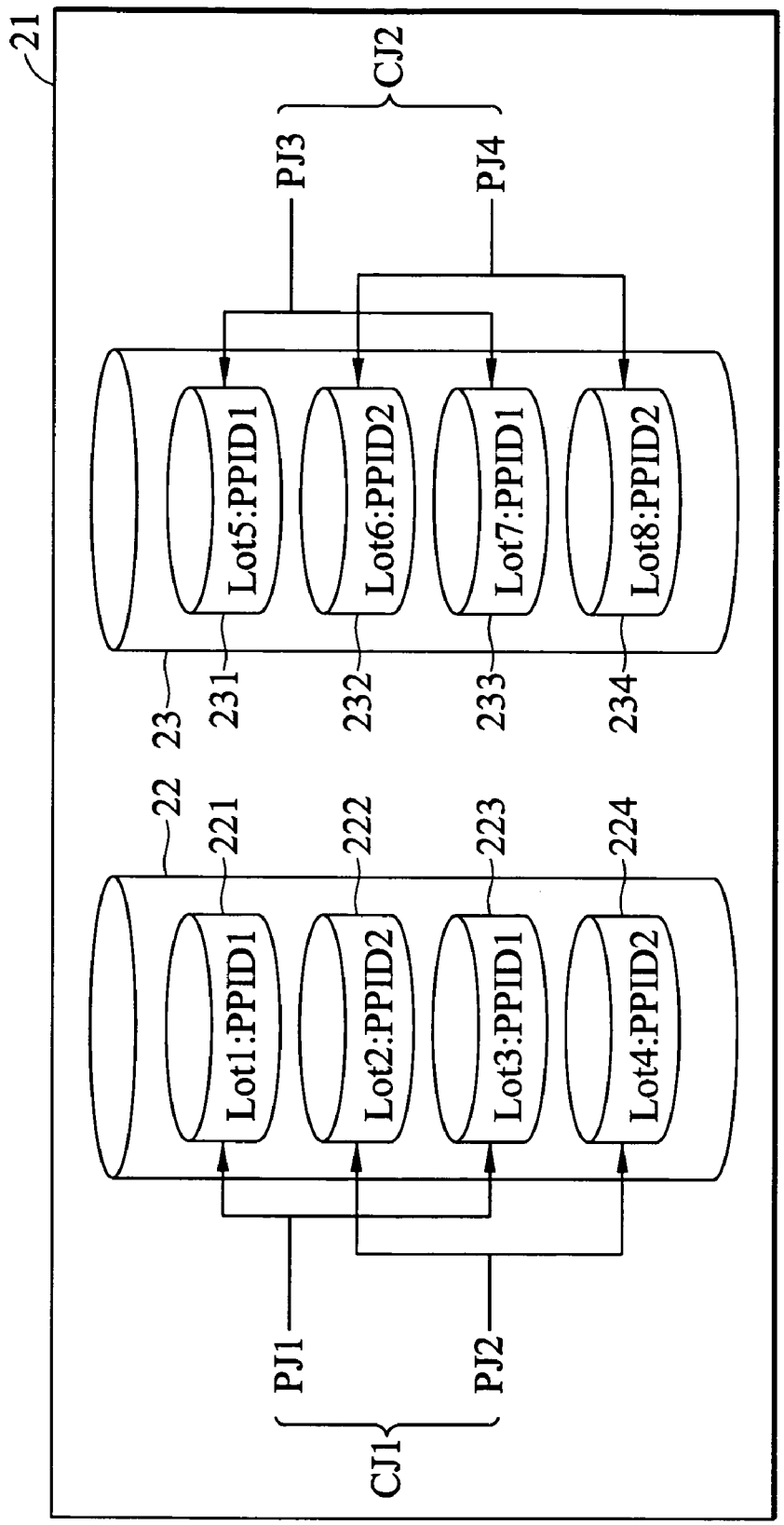
FIGS. 3a, 4a and 5a are schematic diagrams of fabrication tools illustrating three embodiments of the present invention.
Figure 3B:
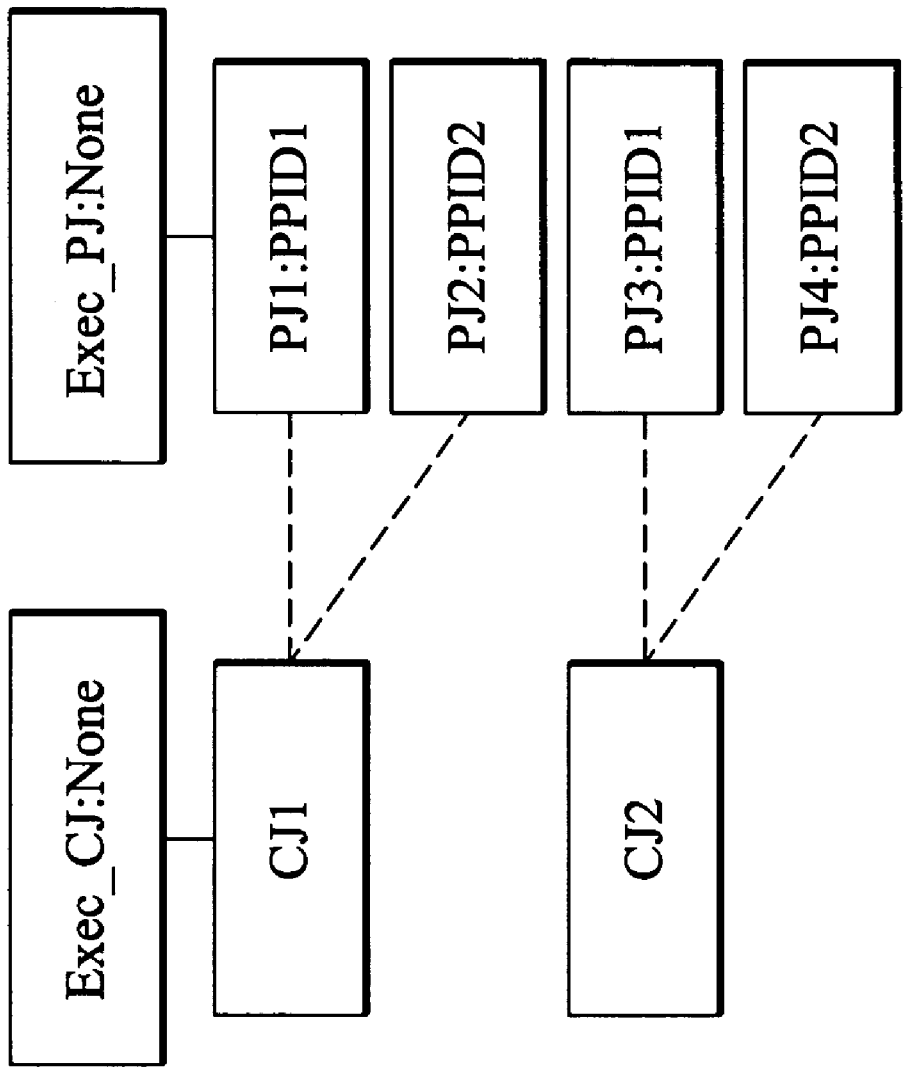
FIGS. 3b, 4b and 5b are schematic diagrams of the job queue illustrating three embodiments of the present invention.
Figure 4A:
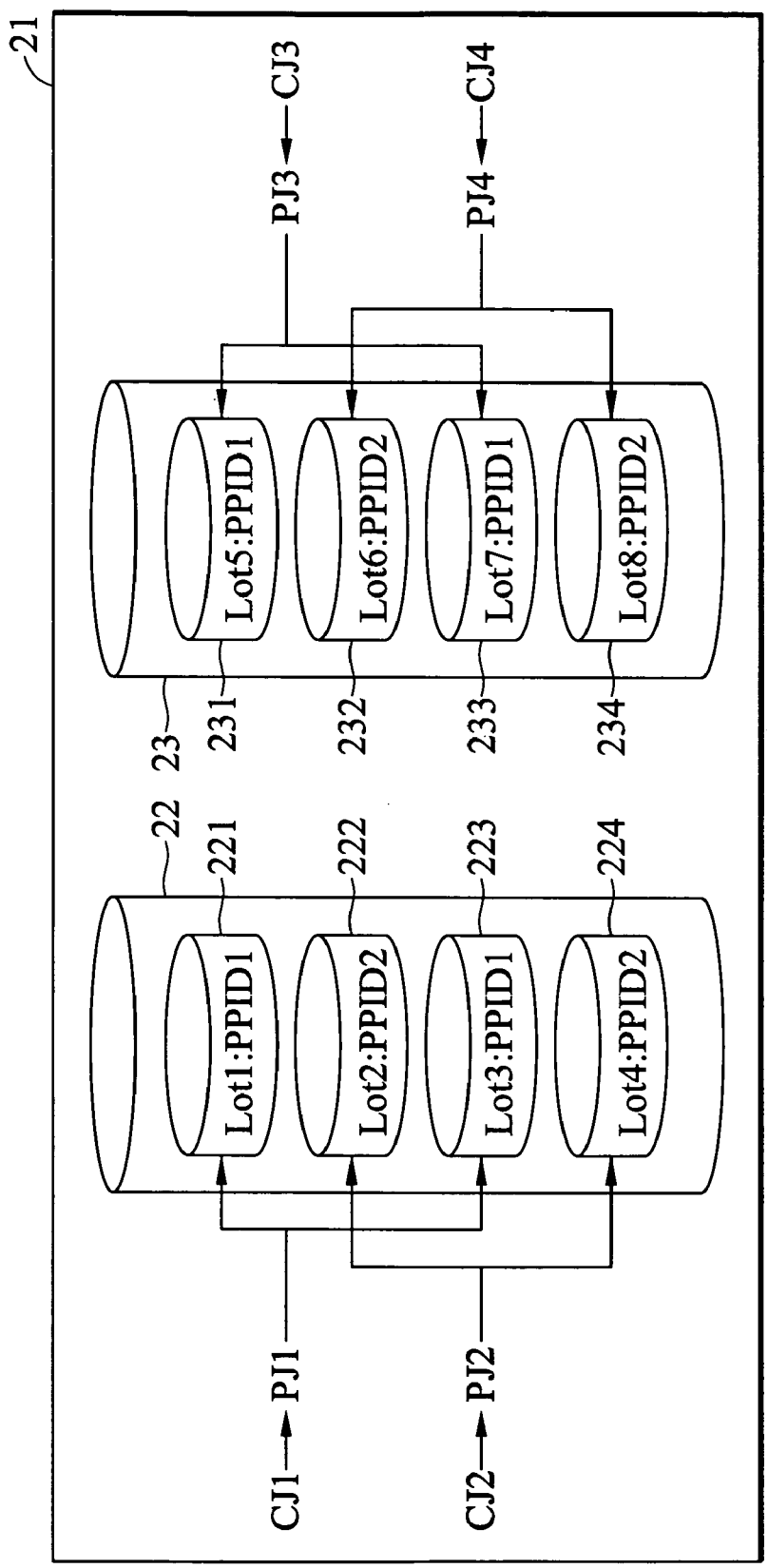
Figure 4B:
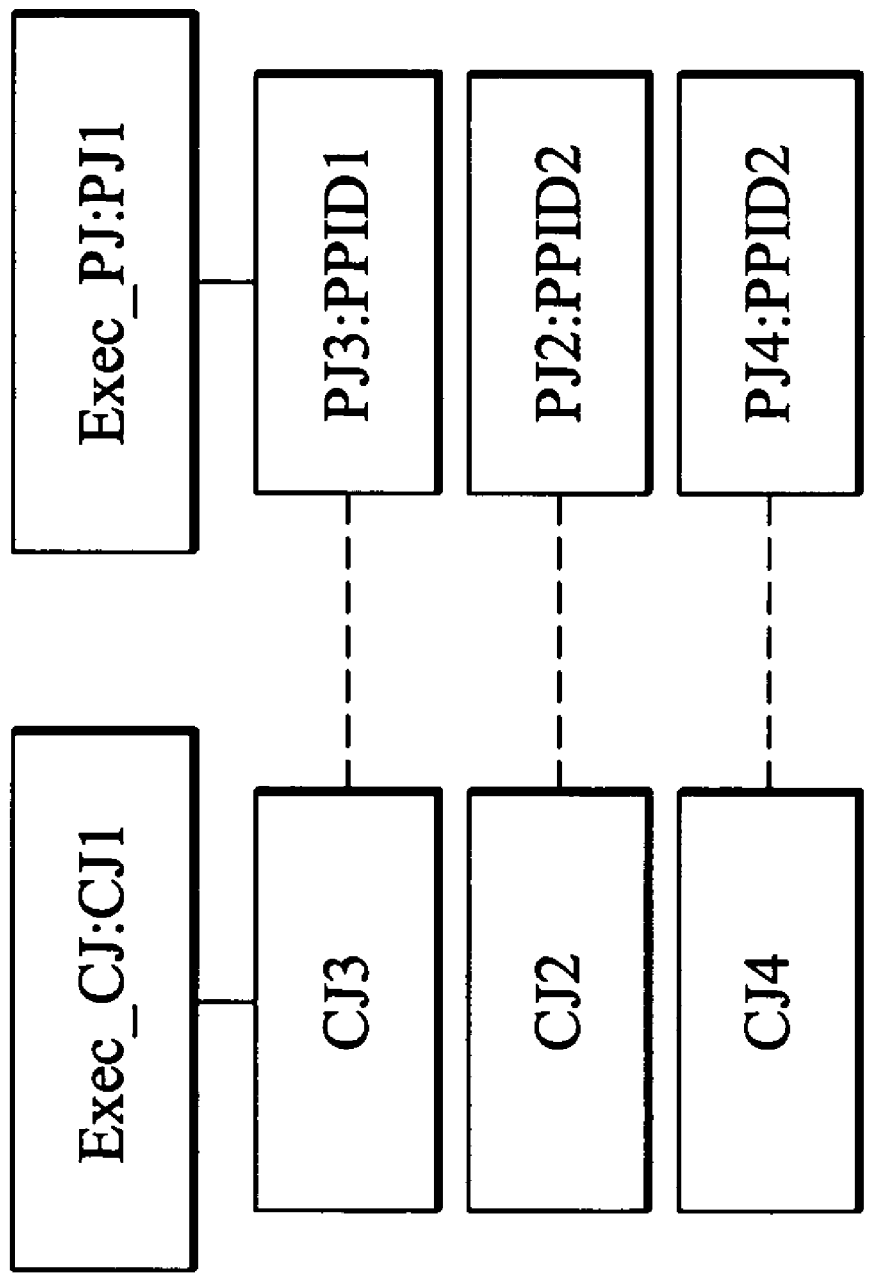
Figure 5A:
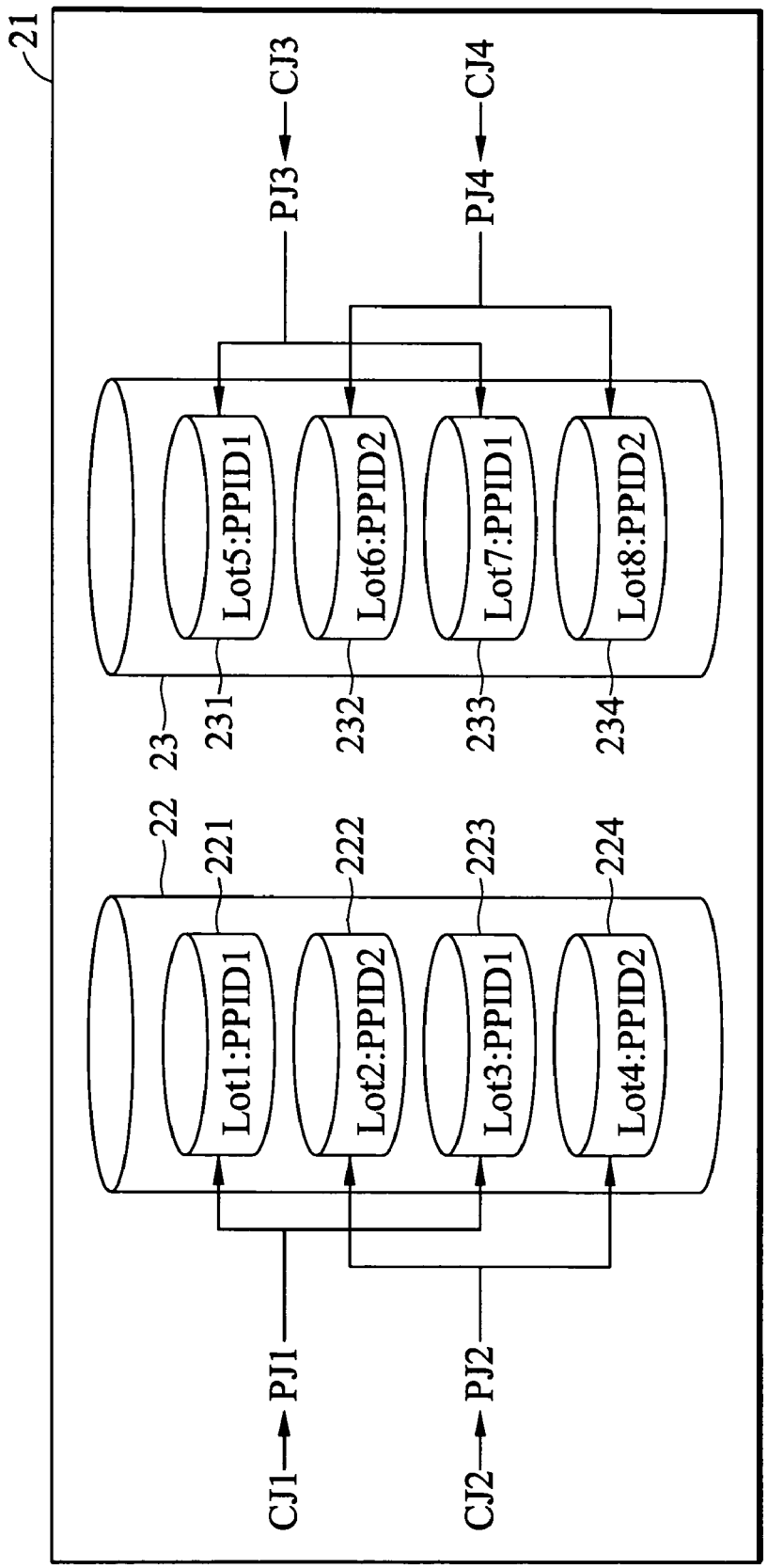
Figure 5B:
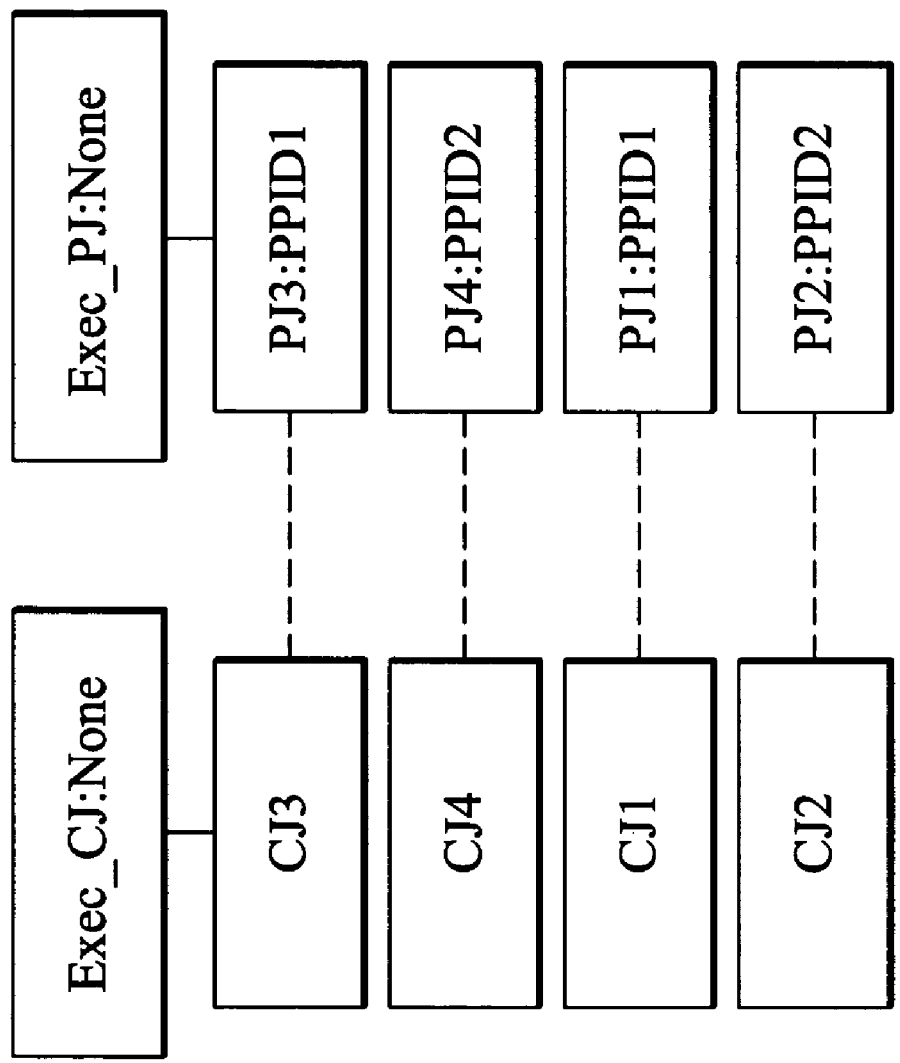

Three preferred approaches, namely single-carrier optimization, multi-carrier optimization and precedence optimization, are described hereafter for job queue rearrangement. FIGS. 3a, 4a and 5a are schematic diagrams of fabrication tools illustrating three embodiments according to the present invention. The fabrication tool 21 loads two carriers 22 and 23, wherein the carrier 22 contains four wafer lots, 221, 222, 223 and 224 which are processed by recipe "PPID1", "PPID2", "PPID1" and "PPID2" respectively, and the carrier 23 also contains four wafer lots, 231, 232, 233 and 234 which are processed by recipe "PPID1", "PPID2", "PPID1" and "PPID2" respectively. FIGS. 3b, 4b and 5b are schematic diagrams of the job queue according to the three embodiments of the present invention.

In the single-carrier optimization approach, referring to FIG. 3a, wafer lots are clustered according to different recipes and carriers into CPP groups by the job initiation module 121. Subsequently, four process jobs, such as "PJ1", "PJ2", "PJ3" and "PJ4", respectively containing lots {221, 223}, {222, 224}, {231, 233}, and {232, 234}, are created by the job initiation module 121, and two control jobs, such as "CJ1" and "CJ2", respectively containing process jobs {PJ1, PJ2} and {PJ3, PJ4} are created for each carrier. Therefore, referring to FIG. 3b, when the fabrication tool 21 sequentially executes process jobs "PJ1", "PJ2", "PJ3" and "PJ4", the fabrication task is sequentially performed upon wafer lots 221, 223, 222, 224, 231, 233, 232 and 234. While fabrication tool 21 performs preparations eight times for each recipe change according to the conventional arrangement, using this approach, preparation tasks are only performed at the beginning of each process job.

In the multi-carrier optimization approach, referring to FIG. 4a, wafer lots are clustered according to different recipes and carriers into CPP groups by the job initiation module 121. Four process jobs, such as "PJ1", "PJ2", "PJ3" and "PJ4", respectively containing lots {221, 223}, {222, 224}, {231, 233} and {232, 234} are created by the job initiation module 121, and four control jobs, such as "CJ1", "CJ2", "CJ3" and "CJ4", are respectively created for each process job. When the job rearrangement module 122 receives the process job "PJ1" event from the fabrication tool, it detects a control job "CJ3" containing a common process recipe and moves the control job "CJ3" to the top of the job queue, enabling the fabrication tool 21 to subsequently execute the control job "CJ3". Therefore, referring to FIG. 4b, when the fabrication tool 21 sequentially executes process jobs "PJ1", "PJ3", "PJ2" and "PJ4", and the fabrication tasks are sequentially performed upon wafer lots 221, 223, 231, 233, 222, 224, 232 and 234. Using this approach, the fabrication tool 21 only performs two preparations at the beginning of process jobs "PJ1" and "PJ2".

In the precedence optimization approach, referring to FIG. 5a, wafer lots are clustered according to different recipes and carriers by the job initiation module 121 into CPP groups. Four process jobs, such as "PJ1", "PJ2", "PJ3" and "PJ4", respectively containing lots {221, 223}, {222, 224}, {231, 233} and {232, 234} are created by the job initiation module 121, and four control jobs, such as "CJ1", "CJ2", "CJ3" and "CJ4", are respectively created for each process job. The job initiation module 121 sets a priority for each control job according to wafer carrier/lot information from the manufacturing execution system (MES) (not shown). For example, priorities of control jobs, such as "CJ1", "CJ2", "CJ3" and "CJ4", are set to 10, 10, 1 and 1 respectively. The job initiation module 121 rearranges the control jobs in descending order according to the priorities. Therefore, referring to FIG. 5b, when the fabrication tool 21 sequentially executes process jobs "PJ3", "PJ4", "PJ1" and "PJ2", the fabrication task is performed upon wafer lots 231, 233, 232, 234, 221, 223, 222 and 224. Using this approach, the arrangement of wafer lots considers not only common recipes but also priority.

Figure 6:
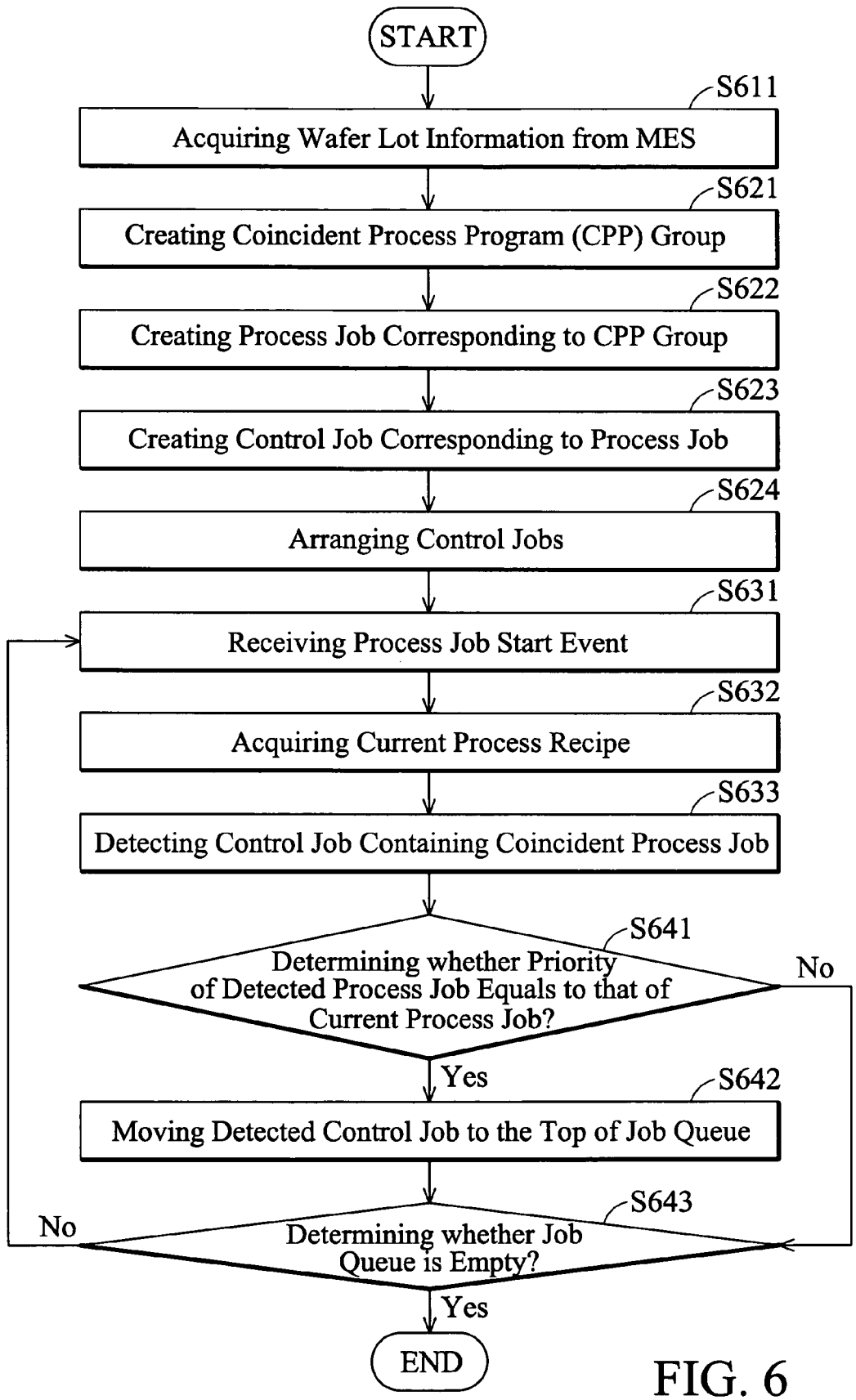
FIG. 6 is a flowchart showing the method of job queue management according to the present invention.

FIG. 6 is a flowchart showing the method of job queue management according to the present invention. The method begins in step S611 by acquiring wafer lot information regarding which specific wafers require processing by which recipe from a manufacturing execution system (MES) (not shown). In step S621, wafer lots processed by a common recipe are clustered into a common process program (CPP) group. Process jobs containing wafer lots in the CPP group are created in step S622, and each process job corresponds to the CPP group. Control jobs associated with at least one process job with priorities are created in step S623 and rearranged in descending order according to control job priorities in step S624.

Subsequent to the initiation, the process proceeds to step S631 to receive a process job start event from the fabrication tool 21. In step S632, a current process recipe is acquired from the fabrication tool 21. In step S633, a control job containing common recipe is detected by comparison with the currently performed recipe. Whether the priority of the detected control job equals that of the current process job is determined in step S641, if so, the process proceeds to step S642; and otherwise, proceeds to step S643. In step S642, the detected control job is moved to the top of the job queue. Whether the job queue is empty is determined in step S643, and if so, the process is complete; otherwise, the process proceeds to step S631.

Figure 7:
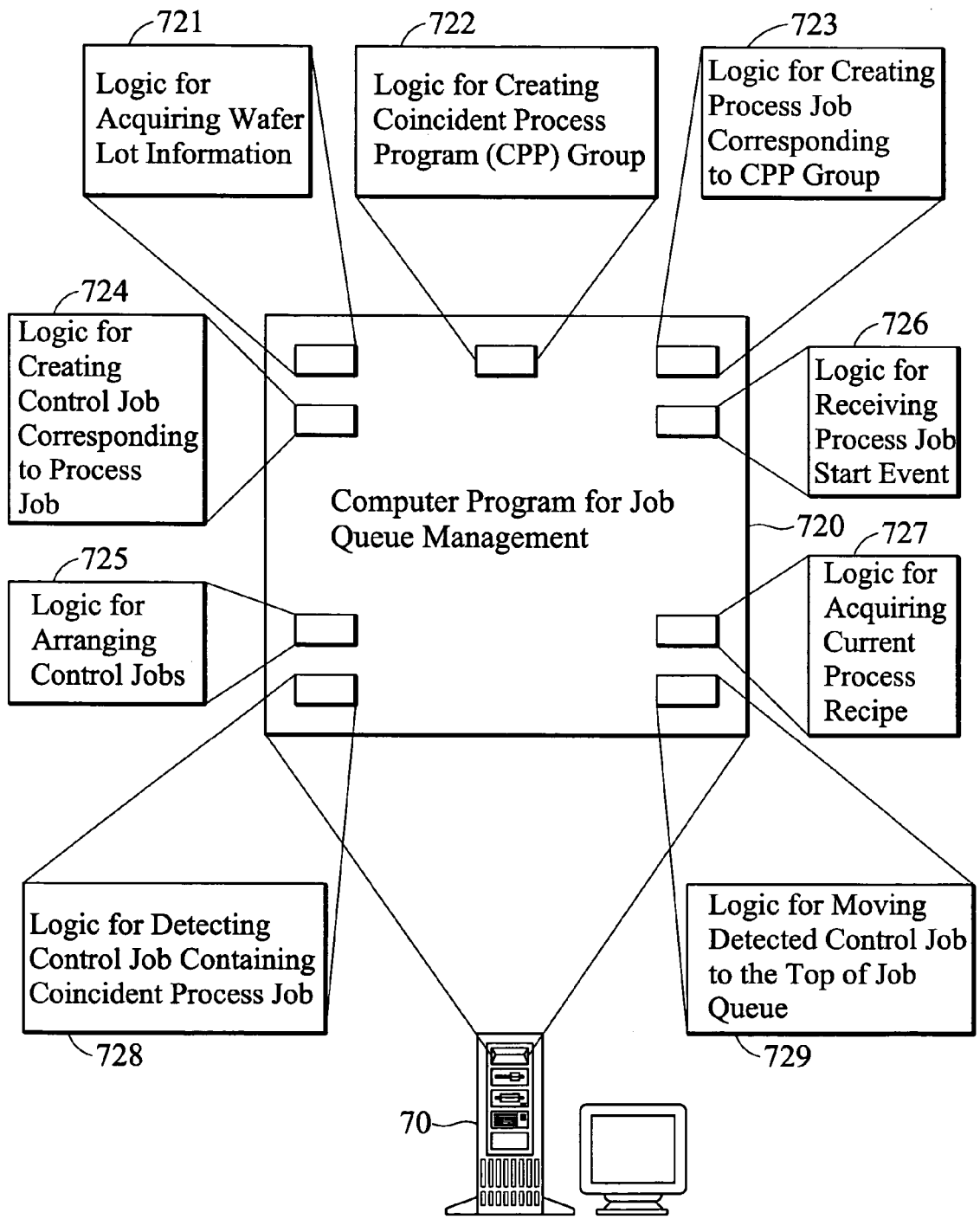
FIG. 7 is a diagram of a storage medium for a computer program providing the method of job queue management according to the invention.

The invention additionally discloses a storage medium storing a computer program providing the disclosed method of job queue management, as shown in FIG. 7. The computer program product includes a storage medium 70 having computer readable program code embodied in the medium for use in a computer system, the computer readable program code comprising at least computer readable program code 721 acquiring wafer lot information regarding which specific wafers require processing by which recipe from a MES or a CIM system, computer readable program code 722 creating a CPP group containing wafer lots which are processed by a common recipe, computer readable program code 723 creating a process job corresponding to a CPP group, computer readable program code 724 creating a control job corresponding to a process job, computer readable program code 725 rearranging control jobs according to priorities thereof in descending order, computer readable program code 726 receiving a process job start event from a fabrication tool, computer readable program code 727 acquiring a current process recipe from a fabrication tool, computer readable program code 728 detecting a control job containing a common recipe by comparison with the currently performed recipe and computer readable program code 729 moving the detected control job to the top of the queue if its priority equaling that of the current process job.

The methods and system of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A system of job queue management, comprising:
   a fabrication tool; and
   a job queue management apparatus configured to acquire a plurality of wafer lot records individually regarding a plurality of wafers processed by a common recipe, cluster the wafer lots processed by the common recipe into a group, create a process job corresponding to the group and store the process job in a job queue of the fabrication tool, wherein the job queue management apparatus creates a control job corresponding to the process job, stores the control job in the job queue of the fabrication tool, receives an event indicating starting a new process job from the fabrication tool, acquires an executed recipe corresponding to the new process job, and moves the control job containing the process job performing the common recipe common to the executed recipe to the top of the queue of the fabrication tool.

2. The system of claim 1 wherein the wafer lot records are acquired from a manufacturing execution system (MES) or a computer integrated manufacturing (CIM) system.

3. The system of claim 1 wherein the job queue management apparatus creates a control job corresponding to all process jobs within a carrier, and stores the control job in the job queue of the fabrication tool.

4. The system of claim 1 wherein the job queue management apparatus creates a control job corresponding to the process job and a priority thereof, stores the control job in the job queue of the fabrication tool, and arranges the control job according to the priority thereof.

5. The system of claim 1 wherein the fabrication tool provides a plurality of services compliant to a 300 mm semiconductor equipment and material international (SEMI) standard.

6. The system of claim 5 wherein the job queue management apparatus creates the process job corresponding to the group by executing the service, creates a control job corresponding to all process jobs within a carrier by executing the service, and stores the control job in the job queue of the fabrication tool by executing the service.

7. The system of claim 5 wherein the job queue management apparatus creates a control job corresponding to the process job and a priority thereof by executing the service, stores the control job in the job queue of the fabrication tool by executing the service, and arranges the control job according to the priority thereof by executing the service.

8. A method of job queue management, the method comprising using a computer to perform the steps of:
   acquiring a plurality of wafer lot records individually regarding a plurality of wafers processed by a common recipe;
   clustering the wafer lots processed by the common recipe into a group;

creating a process job corresponding to the group;
storing the process job in a job queue of a fabrication tool;
creating a control job corresponding to the process job;
storing the control job in the job queue of the fabrication tool;
receiving an event indicating starting a new process job from the fabrication tool;
acquiring an executed recipe corresponding to the new process job; and
moving the control job containing the process job performing the common recipe common to the executed recipe to the top of the queue of the fabrication tool.

9. The method of claim 8 wherein the wafer lot records are acquired from a manufacturing execution system (MES) or a computer integrated manufacturing (CIM) system.

10. The method of claim 8 further comprising the steps of:
creating a control job corresponding to all process jobs within a carrier; and
storing the control job in the job queue of the fabrication tool.

11. The method of claim 8 further comprising the steps of:
creating a control job corresponding to the process job and a priority thereof;
storing the control job in the job queue of the fabrication tool; and
arranging the control job according to the priority thereof.

12. The method of claim 8 wherein the fabrication tool provides a plurality of services compliant to a 300 mm semiconductor equipment and material international (SEMI) standard.

13. The method of claim 12 further comprising the steps of:
creating the process job corresponding to the group by executing the service;
creating a control job corresponding to all process jobs within a carrier by executing the service; and
storing the control job in the job queue of the fabrication tool by executing the service.

14. The method of claim 12 further comprising the steps of:
creating a control job corresponding to the process job and a priority thereof by executing the service;
storing the control job in the job queue of the fabrication tool by executing the service; and
arranging the control job according to the priority thereof by executing the service.

15. A machine-readable storage medium storing a computer program which when executed performs a method of job queue management, the method comprising the steps of:
acquiring a plurality of wafer lot records individually regarding a plurality of wafers processed by a common recipe;
clustering the wafer lots processed by the common recipe into a group;
creating a process job corresponding to the group;
storing the process job in a job queue of a fabrication tool;
creating a control job corresponding to the process job;
storing the control job in the job queue of the fabrication tool;
receiving an event indicating starting a new process job from the fabrication tool;
acquiring an executed recipe corresponding to the new process job; and
moving the control job containing the process job performing the common recipe common to the executed recipe to the top of the queue of the fabrication tool.

16. The machine-readable storage medium of claim 15 wherein the wafer lot records are acquired from a manufacturing execution system (MES) or a computer integrated manufacturing (CIM) system.

17. The computer-readable storage medium of claim 15, wherein the method further comprises the steps of:
creating a control job corresponding to all process jobs within a carrier; and
storing the control job in the job queue of the fabrication tool.

18. The computer-readable storage medium of claim 15, wherein the method further comprises the steps of:
creating a control job corresponding to the process job and a priority thereof;
storing the control job in the job queue of the fabrication tool; and
arranging the control job according to the priority thereof.

19. The computer-readable storage medium of claim 15 wherein the fabrication tool provides a plurality of services compliant to a 300 mm semiconductor equipment and material international (SEMI) standard.

20. The computer-readable storage medium of claim 19, wherein the method further comprises the steps of:
creating the process job corresponding to the group by executing the service;
creating a control job corresponding to all process jobs within a carrier by executing the service; and
storing the control job in the job queue of the fabrication tool by executing the service.

21. The computer-readable storage medium of claim 19, wherein the method further comprises the steps of:
creating a control job corresponding to the process job and a priority thereof by executing the service;
storing the control job in the job queue of the fabrication tool by executing the service; and
arranging the control job according to the priority thereof by executing the service.

* * * * *